US009192966B2

(12) United States Patent
Zanatta

(10) Patent No.: US 9,192,966 B2
(45) Date of Patent: Nov. 24, 2015

(54) AUTOMATIC WASHING DEVICE FOR CONTINUOUS SURFACES, IN PARTICULAR SOLAR THERMAL COLLECTORS, PHOTOVOLTAIC PANELS, CONTINUOUS GLAZED BUILDING WALLS AND SIMILAR SURFACES

(71) Applicant: WASHPANEL S.R.L., Villorba (Treviso) (IT)

(72) Inventor: Francesco Zanatta, Spresiano (IT)

(73) Assignee: WASHPANEL S.R.L., Villorba (IT)

( * ) Notice: Subject to any disclaimer, the term of this patent is extended or adjusted under 35 U.S.C. 154(b) by 0 days.

(21) Appl. No.: 14/358,087

(22) PCT Filed: Nov. 28, 2012

(86) PCT No.: PCT/IB2012/056787
§ 371 (c)(1),
(2) Date: May 14, 2014

(87) PCT Pub. No.: WO2013/080135
PCT Pub. Date: Jun. 6, 2013

(65) Prior Publication Data
US 2014/0310906 A1    Oct. 23, 2014

(30) Foreign Application Priority Data

Dec. 1, 2011 (IT) .............. TV2011A0163

(51) Int. Cl.
*A47L 1/02* (2006.01)
*B08B 1/04* (2006.01)
*F24J 2/46* (2006.01)

(52) U.S. Cl.
CPC ... *B08B 1/04* (2013.01); *A47L 1/02* (2013.01); *F24J 2/461* (2013.01); *Y02B 10/20* (2013.01); *Y02E 10/40* (2013.01)

(58) Field of Classification Search
CPC ............ B08B 1/00; B08B 3/024; F24J 2/461; A47L 11/38; Y02B 10/20
USPC .................... 15/97.1, 102, 103, 246
See application file for complete search history.

(56) References Cited

U.S. PATENT DOCUMENTS

| 1,197,763 | A * | 9/1916 | Plontinizky | 15/250.22 |
| 6,986,186 | B1 * | 1/2006 | Dube | 15/250.01 |
| 2011/0094549 | A1 * | 4/2011 | Lin | 134/198 |

FOREIGN PATENT DOCUMENTS

DE    10 2010 025 845 A1    1/2011
DE    20 2010 015 730 U1    3/2011
(Continued)

OTHER PUBLICATIONS

Italian Search Report issued in Italian Patent Application No. ITTV20110163 on Jun. 1, 2012 (with translation).
(Continued)

*Primary Examiner* — Monica Carter
*Assistant Examiner* — Michael Jennings
(74) *Attorney, Agent, or Firm* — Oliff PLC

(57) ABSTRACT

The present invention relates to an automatic device for washing continuous surfaces, such as solar thermal collectors, photovoltaic panels, continuous glazed building walls and similar surfaces, comprising at least one cleaning machine, at least one motor and a support. The cleaning machine includes a translation device that includes a torque shaft driven into rotation by the motor and connecting at least a first and a second translation unit arranged on the cleaning machine at the respective ends of the torque shaft.

9 Claims, 3 Drawing Sheets

(56) References Cited

FOREIGN PATENT DOCUMENTS

| | | |
|---|---|---|
| EP | 0 505 956 A1 | 9/1992 |
| EP | 2 048 455 A2 | 4/2009 |
| EP | 2 295 158 A1 | 3/2011 |
| JP | A-2011-1800 | 1/2011 |
| KR | 10-2009-0090722 A | 8/2009 |
| WO | WO 2004/091816 A1 | 10/2004 |
| WO | WO 2010/072877 A1 | 7/2010 |
| WO | WO 2010/106195 A1 | 9/2010 |
| WO | WO 2010/142837 A1 | 12/2010 |
| WO | WO 2011/004411 | 1/2011 |
| WO | WO 2011/029416 A1 | 3/2011 |

OTHER PUBLICATIONS

Written Opinion issued in Italian Patent Application No. ITTV20110163 on Jun. 1, 2012 with English language Examiner's Opinion.

International Search Report issued in International Application No. PCT/IB2012/056787 on Feb. 28, 2014.

Written Opinion of the International Searching Authority issued in International Application No. PCT/IB2012/056787 on Feb. 28, 2014.

Jun. 3, 2014 International Preliminary Report on Patentability from International Patent Application No. PCT/IB2012/056787.

* cited by examiner

AUTOMATIC WASHING DEVICE FOR CONTINUOUS SURFACES, IN PARTICULAR SOLAR THERMAL COLLECTORS, PHOTOVOLTAIC PANELS, CONTINUOUS GLAZED BUILDING WALLS AND SIMILAR SURFACES

TECHNICAL FIELD OF INVENTION

The present invention relates to an automatic washing device for continuous surfaces, such as solar thermal collectors, photovoltaic panels, continuous glazed building walls, industrial skylights and similar surfaces requiring cleaning on a daily or frequent basis.

STATE OF THE ART

The economic advantage in the photovoltaic field is ensured by cleaning the surfaces of the panels, which makes it possible to maintain a high and long-lasting efficiency of the system. The presence of dirt on such surfaces drastically lowers the efficiency of the panels and their economic advantage.

Clean panel surfaces are also necessary to keep the photovoltaic cells in good condition for the purpose of guaranteeing their perfect operation; in fact, the presence of dirt causes overheating of the cells and compromises their operation.

In the housing field, cleaning the continuous glazed front of the buildings is required mainly for the aesthetic and decorative aspects of the building. However, if within the double-glazing are present systems for the production of electric power or heat, cleaning is also necessary to maintain said systems in an efficient state.

The currently known systems for cleaning continuous surfaces are substantially of two types: a first type envisages the use of vehicles provided with a mechanical arm comprising a rotating brush and nozzles; examples of this first type are described in the patent documents WO 2011/029416, EP 2295158, WO 2010/142837, WO 1010/106195 and WO 2010/072877. The systems of this type of are exclusively capable of cleaning installations that are on the ground and that are provided with suitable spacing between the rows of panels to allow the passage of the vehicle.

A second type is represented by fixed systems running on guides. These systems, comprising bars on which are mounted rotating nozzles or brushes, adopt lateral guides fixed to the panelling structure or to the roof, or they are provided with transport systems such as belts, chains, linear actuators and cylinders to allow the parallel movement of the bars along the panelling structures.

One drawback found in systems of this type lies in their inability to pass from one row of panels to another due to the structure and complexity of the guide means. This makes them economically inconvenient for the application in very extensive photovoltaic parks. Some examples of this second type of systems are described in patent documents WO 2011/004411, DE 10 2010 025 845, JP 2011-1800, EP 2048455 e KR10-2009-0090722.

DE 20 2010 015 730 describes a device for cleaning inclined glazed surfaces in which a cleaning apparatus runs along a guide cable fastened to an edge of the glazed surface. The apparatus comprises an electrically driven rotating brush and a spraying device with a distributor provided with nozzles.

EP 0505956 discloses an apparatus for cleaning smooth continuous surfaces that comprises a cleaning unit and an anchoring unit. The cleaning unit comprises rotating brushes, nozzles for spraying liquid detergents, suction and/or blowing ducts cooperating with each other. The anchoring unit comprises a pair of motor-driven chain tracks to which are associated a plurality of suction cups. The anchoring unit includes a further group of chain tracks arranged at right angles to said chain tracks to allow the transversal translation of the apparatus.

SUMMARY OF THE INVENTION

The main objective of the subject matter of the present invention is to devise an automatic device for washing continuous surfaces, such as solar thermal collectors, photovoltaic panels, continuous glazed building walls and similar surfaces, that is capable of overcoming the drawbacks found in the prior art as mentioned above.

In the scope of the above objective, one purpose of the present invention is to devise an automatic device for washing continuous surfaces capable of translating in line with or parallel to said continuous surfaces without requiring the use of fixed guides created on the array of panels or on the structure, such as a roof, supporting the array of panels.

Another purpose is to create a device capable of moving along the surface to be treated even in the presence of gaps on said surface, such as for example empty spaces between one panel and the next or joints between one glass wall and the next.

A further objective is to devise a device capable of automatically treating different rows of panel assemblies, such as for example a photovoltaic park, thanks to its capability of moving from one row to the next in a completely independent manner.

One not least important objective is to devise an automatic device for washing continuous surfaces that achieves the above purpose and objectives at competitive costs and that can be manufactured with the usual well-known machinery and equipment.

The above purpose and objectives, and others that will become more apparent later herein, are achieved by an automatic device for washing continuous surfaces as defined in claim 1.

BRIEF DESCRIPTION OF THE DRAWINGS

Further characteristics and advantages of an automatic device for washing continuous surfaces according to the present invention will become more evident from the following description of a particular, but not exclusive, embodiment illustrated purely by way of non-limiting example with reference to the attached figures, wherein.

DETAILED DESCRIPTION OF THE INVENTION

Figure 1:
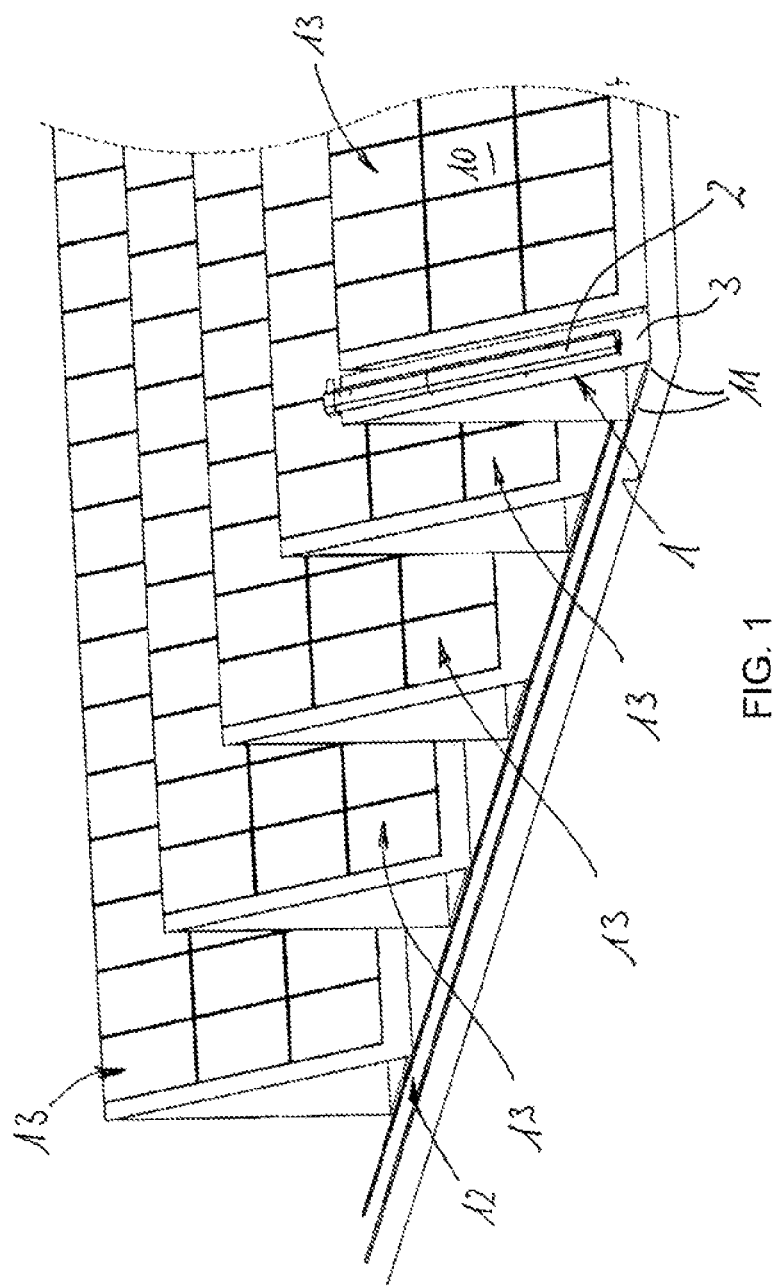
FIG. 1 schematically illustrates an installation comprising a plurality of photovoltaic panels arranged in a plurality of rows wherein is applied an automatic device for washing continuous surfaces according to the present invention in an idle position.

With reference to the enclosed figures, reference numeral 1 indicates an automatic washing device for continuous surfaces 10 according to the present invention, which comprises a cleaning machine 2 and a support 3 for docking the machine 2 in an idle condition.

The cleaning machine 2 comprises a frame 4 in which are fastened the mechanical parts for the movement and rotation of a rotating brush 5. The translation motion of the cleaning machine 2 and the rotation of the brush 5 are provided by an electric motor 6.

Advantageously, the electric motor 6 is powered by batteries 7 that are recharged by solar energy, through a photovoltaic panel, or through connection to the power grid.

The linear motion of the cleaning machine 2 along the surface 10 to be treated is provided by a translation device comprising a torque shaft 8, driven into rotation by the motor 6 and connecting at least a first and a second translation unit, collectively identified with the reference numeral 9, each including pulley means interconnected by driving belts and friction wheels interacting with the pulley means; the first and the second translation unit 9 are arranged on end plates 14 of the frame 4 at the respective ends of the rotating brush 5. The rotation produced by the motor 6 on the torque shaft 8 produces in turn a rotation in a synchronous mode on the first and on the second translation unit 9.

Figure 2:
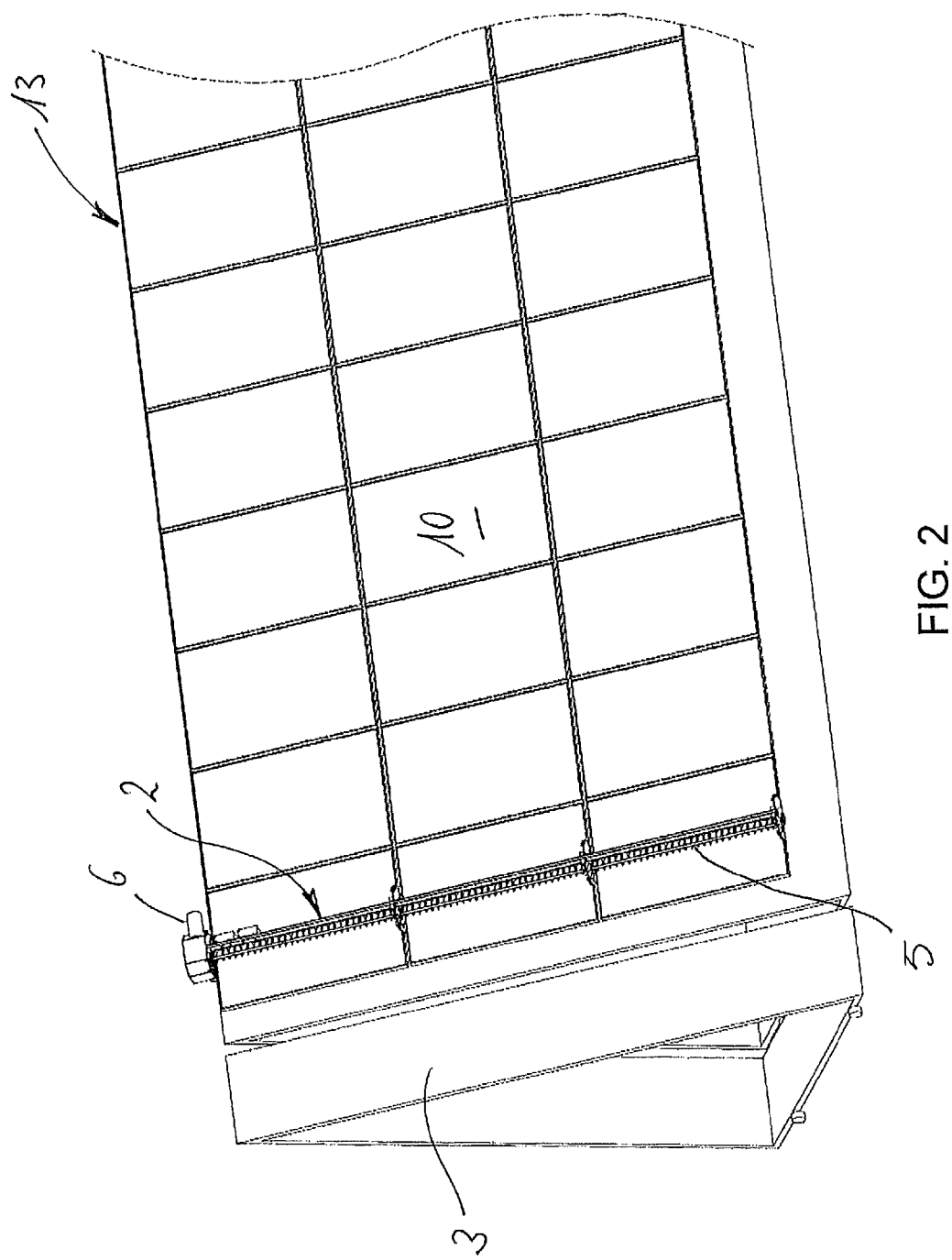
FIG. 2 schematically illustrates the device according to the present invention in an operating position along the panel assembly or glass wall.

When the cleaning machine 2 is in the operating position on the surface 10, as shown in FIG. 2, the translation units 9 push against the opposing upper and lower edges of the surface 10 and, through the rotation applied by the torque shaft 9, provide the linear translation of the machine 2 along the surface 10. The edges of the surface 10 thus make up the guides for the translation of the machine 2 along said surface 10, without requiring special drive means as in the prior art solutions; in addition, the torque shaft 8 that connects and drives the translation units 9 guarantees the parallelism between the machine 2 and the surface 10 during the operating linear translation travel of the machine, thanks to the fact that the extent of movement provided by the torque shaft 8 is the same for both the first and the second translation unit 9.

A further aspect of the translation system of the cleaning machine 2 lies in the fact that the motion transmitted through the torque shaft 8 and the translation units 9 makes it possible to advance the machine 2 even if there are gaps in the surface to be treated 10, such as a gap between one panel and the next, provided that the distance between the edges of two adjacent panels remains within certain limits.

Figure 3:
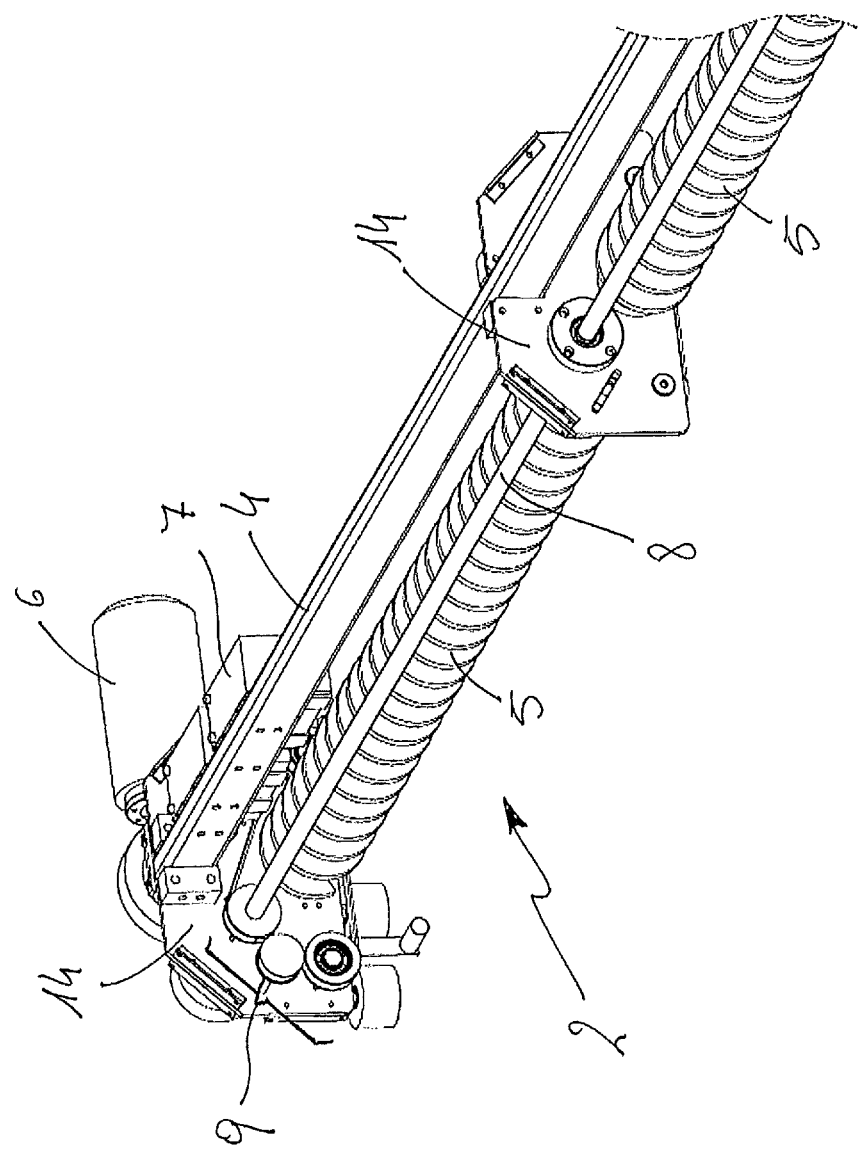
FIG. 3 illustrates, in a perspective view, the automatic device for washing continuous surfaces according to the present invention.

The washing device according to the present invention can also be made in a modular form, depending on the extension of the surface 10 to be treated, by joining two or more machines 2 to each other and connecting them by a single torque shaft 8, as shown in FIG. 3; to each of the intermediate plates 4, as also to the end plates 14, will be associated a single translation unit 9; then the torque shaft 8, connecting the different translation units 9 to each other, transmits the rotation motion to them in a synchronous manner, thus guaranteeing the parallelism of the assembly made up of two or more machines 2 during the linear translation travel.

Naturally, the modular structure may also be made by joining two or more rotating brushes 5 to a single frame 4 having an appropriate length for the extension of the surface to be treated.

It is also possible to provide two motors 6, arranged at the respective ends of the modular structure, if the modular structure extends to considerable overall lengths.

The operation of the device can be controlled manually or automatically by computer through appropriate software and suitable sensors, which can automatically start the cleaning operation when specific conditions are sensed, as for example during rainy days. At the end of the washing operation, the machine or machines 2 stop automatically on the docking support 3 to avoid hiding the photovoltaic system from the light during the daily production of energy or having unsightly encumbrances on the glass face on a building.

A further feature of the present invention lies in the possibility of automatically treating different rows of panels, a particularly suitable characteristic in case of photovoltaic panels or solar thermal collectors arranged in multiple rows, or in the case of photovoltaic or solar parks.

In this case, the docking support 3 is made mobile through a motor drive 11 and slidable along guides 12 arranged laterally to the rows of panels 13. Thus, the support 3, in addition to serving as a station of the machine or machines 2 in the idle state, also serves as a trolley to transfer the machine or machines 2 between adjacent rows of panels 13, as it can translate from one panel to the next so as to place the machine or machines 2 next to the panels 13 to be treated.

From the above, it is evident that the present invention achieves the initially foreseen purposes and advantages: in fact, the present inventors have devised an automatic washing device for continuous surfaces, such as solar thermal collectors, photovoltaic panels, continuous glazed building walls, industrial skylights and similar surfaces, capable of overcoming the drawbacks of known prior art solutions.

In particular, it is observed that the automatic device according to the present invention has the capability of translating linearly while remaining parallel to the surfaces to be treated without requiring the use of special guides on the panelling or on the structure, roof or floor supporting the panels.

Thus, it is also possible to carry out the installation of the device on an existing system, or the device can be installed on the glass wall of a building in an extremely simple manner, with installation times considerably shorter than is the case with existing solutions.

Furthermore, the device has the capability of advancing along the surface to be treated even in the presence of gaps on said surface, such as for example empty spaces between one panel and the next or joints between one glass wall and the next.

Thanks to the possible presence of the trolley, the device can also treat automatically different rows of panelling arrays, such as for example a photovoltaic park, as it is able to move from one row to the next in a completely independent manner.

Naturally, the present invention is open to numerous applications, modifications of variations without thereby departing from the scope of patent protection as defined by independent claim 1.

In addition, the materials and equipment used to achieve the present invention, as well as the shapes and dimensions of the individual components, may be the most suitable for the specific requirements.

The invention claimed is:

1. An automatic washing device for continuous surfaces, comprising:
   at least one cleaning machine,
   at least one motor and
   one support for said at least one cleaning machine,
   wherein said cleaning machine comprises a translation device that includes a torque shaft driven into rotation by said motor and connecting at least a first and a second translation unit arranged on said cleaning machine at the respective ends of said torque shaft,
   wherein linear translation movement of said cleaning machine along a surface to be treated is provided by synchronous rotation movement transmitted by said torque shaft to said first and second translation units, and wherein said first and second translation units are adapted to act against opposing edges of said surface to be treated during the translation of said cleaning machine, the synchronous rotation of said first and second translation unit maintaining parallelism of said cleaning machine with resect to said surface to be treated.

2. The device according to claim 1, wherein the edges of said surface cooperating with said first and second translation unit form the guide means during the translation travel of said cleaning machine along said surface.

3. The device according to claim 1, wherein said cleaning machine comprises a frame to which are associated said first and second translation unit.

4. The device according to claim 1, wherein said first and second translation unit include respective pulley means interconnected by drive belts and friction wheels interacting with said pulley means.

5. The device according to claim 1, wherein said device can be made in a modular form by joining two or more cleaning machines, said torque shaft connecting the respective translation units of said two or more cleaning machines.

6. The device according to claim 5, in which two motors are provided arranged at the respective ends of said device made in modular form.

7. The device according to claim 1, wherein said at least one cleaning machine stops automatically on said support at the end of the operating washing phase and docks in the idle condition.

8. The device according to claim 1, wherein said support is made slidably movable along adapted guides to enable the transfer of said at least one cleaning machine between two or more adjacent rows of said surfaces to be treated.

9. The device according to claim 1, wherein the continuous surfaces are at least one of solar thermal collectors, photovoltaic panels and continuous glazed building walls.

* * * * *